United States Patent [19]
Eriksson

[11] 3,957,572
[45] May 18, 1976

[54] PROCESS FOR THE MANUFACTURE OF PAPER PULP FROM WASTE PAPER

[75] Inventor: Erik Folke Eriksson, Johanneshov, Sweden

[73] Assignee: Mo ochs Domsjo AB, Ornskoldsvik, Sweden

[22] Filed: Mar. 13, 1974

[21] Appl. No.: 450,869

[30] Foreign Application Priority Data
Mar. 19, 1973  Sweden ........................... 73038317

[52] U.S. Cl. ................................. 162/4; 162/56; 162/59; 162/380
[51] Int. Cl.² ..................... D21B 1/32; D21B 1/34
[58] Field of Search .............. 162/4, 189, 190, 264, 162/56, 380, 59

[56] References Cited
UNITED STATES PATENTS

| | | | |
|---|---|---|---|
| 2,062,442 | 12/1936 | Campbell | 162/190 X |
| 2,887,430 | 5/1959 | Wallen | 162/190 X |
| 3,057,769 | 10/1962 | Sandberg | 162/4 |
| 3,549,092 | 12/1970 | Baxter, Jr. | 162/4 X |
| 3,849,246 | 11/1974 | Raymond et al. | 162/4 |

FOREIGN PATENTS OR APPLICATIONS

| | | | |
|---|---|---|---|
| 314,288 | 9/1969 | Sweden | 162/4 |

Primary Examiner—S. Leon Bashore
Assistant Examiner—Richard V. Fisher
Attorney, Agent, or Firm—Burgess, Ryan and Wayne

[57] ABSTRACT

A process for the manufacture of paper pulp from waste paper in which the waste paper is comminuted in water in a pulper, pre-cleaned for removal of coarse foreign contaminants, dewatered, kneaded at high concentration, diluted, after-cleaned for removal of finer or coherent soft foreign contaminants and adjusted to a concentration suitable for paper-making, the water respectively used for dilution and obtained during dewatering being circulated in two separate circuits upstream and downstream respectively of the kneading apparatus.

3 Claims, 1 Drawing Figure

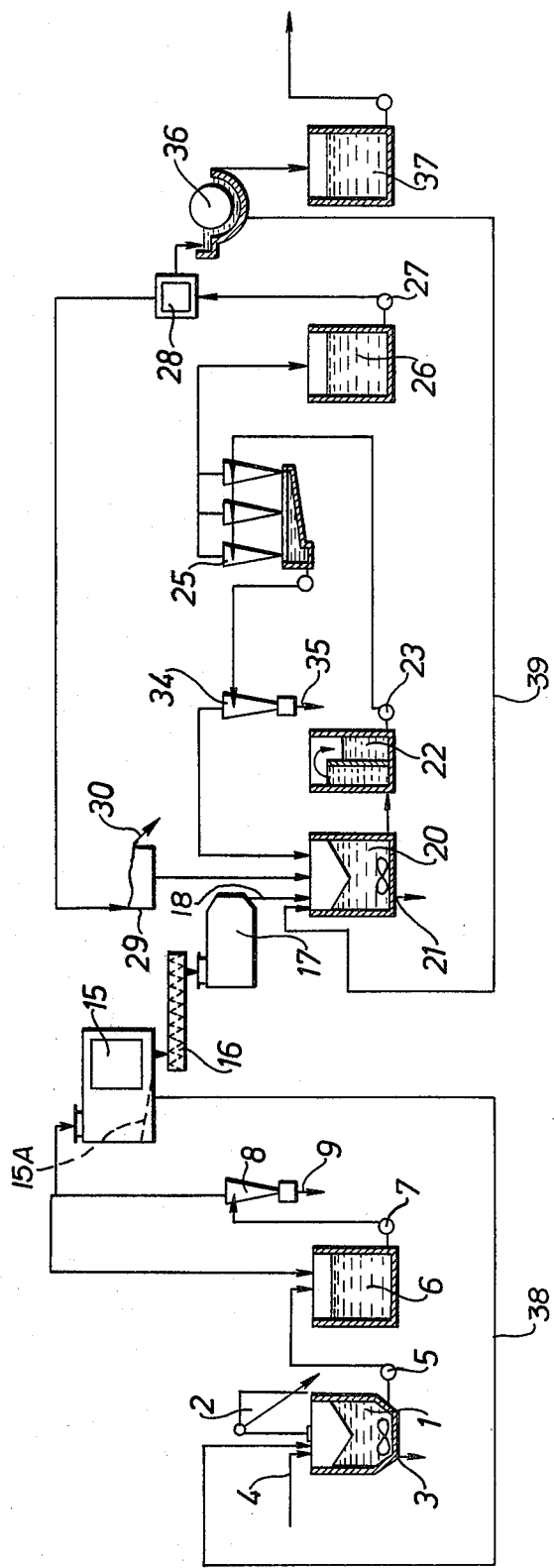

PROCESS FOR THE MANUFACTURE OF PAPER PULP FROM WASTE PAPER

During recent years numerous systems have been developed for the manufacture of paper pulp from waste paper.

In procedures of this kind the waste paper is comminuted in water by means of a machine commonly designated as a pulper. In the pulper and/or after the pulper, the material is cleaned from coarse foreign contaminants. Subsequently, the material is dewatered to a high concentration, i.e. above pumpability, suitably near and preferably above a content of 30 percent solids. The highly concentrated material is subsequently worked by some of the processes which collectively may be designated as kneading, the common feature of which is that no fibre-shortening cutting action between milling surfaces is involved, the working effect in the first place being achieved by mutual friction between fibres. After this kneading treatment, the material is again diluted to a pumpable consistency and is subjected to additional cleaning treatments for removal of fine or coherent soft foreign contaminants. The material is now ready for use in a paper-making machine.

The problem which attracted the greatest attention in connection with the procedures proposed for this purpose is the treatment of the material for removal of foreign contaminants such as larger glass and metal pieces, minor metal articles such as coins, staples, wire clips and also grit, and the treatment of the material for dispersion of wax and bitumen stemming from wet strength paper refuse. In addition, the treatment obviously also has been performed in such a way that complete defibration of the material is obtained without impairing the strength properties and without appreciable loss of fibres.

The process of the present invention constitutes a favourable solution, both from the point of view of environment protection and in respect to the recovery of qualitatively valuable fibre material, of the above-mentioned, in part, antagonistic problems.

One of the basic ideas of the invention resides in that water used for dilution and obtained during dewatering is circulated in two separate circuits upstream and downstream respectively, of the kneading apparatus. An essential advantage of this system resides in that desirable alkaline conditions may be maintained in the circuit upstream of the treating apparatus and that a high-temperature level which is desirable from the treating point of view may be maintained without particular measures.

The risk inherent in this procedure of an enrichment of filler substances, such as clay or the like, released during the comminution of the material in the circuit ahead of the treating apparatus is avoided by adjusting the treating time of the waste paper in the pulper to a duration shorter than that required for complete impregnation of the paper with water and just sufficient to obtain pumpability. Through large screen holes having a diameter ranging from 30 to 40 mm in the outlet of the pulper, the paper thus passes to the dewatering device in the form of large coherent pieces and to the greatest possible extent without any resolution of its structure and thereby a release of fillers or fibres.

An appreciable defibration will not either be encountered in the dewatering device which preferably is a press of the SUDOR-type according to claim 1 of U.S. Pat. No. 3,533,510 and which is constructed and operated so that under the compacting pressure supplied during dewatering, the paper will be completely impregnated with water. In this completely impregnated but scarcely subdivided or defibered state, the paper is introduced into the kneading apparatus. Thus, the paper contains practically all the filler material the accumulation of which in the first water circuit would mean a grave disadvantage but which advantageously can be incorporated into the paper pulp obtained in the second circuit downstream of the kneading apparatus. Also, the dewatering process itself is improved by the low degree of comminution as a dewatering will take place much more easily from pieces of paper then from individual fibres suspended in water, and less expensive type of equipment may be used. After the effective soaking obtained in the dewatering device the dissolution of the fibre bonds takes place without a cutting action between mill surfaces, and therefore without stripping the fibrils and microfibrils, which are so important for the bond, from the fibre surface.

In the kneading apparatus which preferably is a so-called FROTAPULPER, i.e. the apparatus as claimed in Swedish published specification 314,288, the kneading is performed with the aid of non-cutting treating members shaped for example, as two mutually intermeshing treating screws enclosed in a casing and under conditions such that the material is discharged from the apparatus at a temperature of about 70° to 90°C which means that by adjustment of the outlet of the apparatus, the dwelling time and treating intensity in the apparatus is adjusted so that the internal friction in the treated material produces a discharge temperature of about 70° to 90°C. as stated. It is to be noted here that the temperature in the treating zone proper in the apparatus is considerably higher, which is desirable and necessary for dispersing wax, paraffin and bitumen components contained in the material. However, it has been found that the temperature of the material upon discharge from the kneading appparatus is a satisfactory measure of the most desirable temperature conditions within the apparatus and that this temperature without difficulty can be controlled by the amount of energy put into the apparatus. It is known that during kneading treatment of the type here considered the temperature in a material supplied at a drymatter content of e.g. about 30 percent will increase by 1°C upon application of a treating energy of 3 kWh per ton. When the material is treated in, for example, a FROTAPULPER and the material is fed into the apparatus at a temperature of about 40°C it will be necessary, in order to obtain a discharge temperature of 90°C, to cause the apparatus to transfer to the material an amount of energy of /(90–40) × 3 = 150)/ 150 kWh per ton material whereby a material is obtained which is defibered and conditioned by kneading action and in which bitumen components contained therein are well dispersed.

While it is possible in itself to use the material in this condition after suitable dilution and renewed cleaning for removal of small sized foreign contaminants released during kneading and any coherent soft components such as plastic and foil material, as a pulp suitable for introduction into a paper-making machine, such pulp without disadvantage containing both the old filler material and the dispersed bitumenous substances, experience has shown that the thorough dispersion obtained in the FROTAPULPER without undue complication of the process will permit a removal of bitumen components by introducing the material discharged from the apparatus into a mixer where the concentration is reduced to pumpability by the addition of water and in which the material according to a feature characteristic of the present invention, is permitted to stay during an extended time sufficient to cause agglomeration of the dispersed components of asphalt and bitumen type to form lumps which can be screened-off during a subsequent cleaning treatment. This effect which is characteristic of the invention is due to the fact that bitumen particles dispersed in water will not tend to adhere to a wet fibre surface but will be inclined to coalesce to each other.

Equipment which is particularly suitable for performing the invention is hereafter described by reference to the flow sheet illustrated in the attached FIGURE.

Paper supplied by a schematically illustrated device 2 is comminuted in a pulper 1 together with water supplied through conduit 4, for example from the white water system of a paper-making machine. The paper, which according to the invention only is comminuted to the least possible extent, passes through a screen plate in the bottom of the pulper having holes of an unconventionally large diameter of 30 to 40 mm, the paper being conveyed by means of a pump 5 via an intermediary container 6 and an additional pump 7 to a vortex cleaner 8. Coarse foreign objects such as tools, metals scrap, wires and cords are periodically or continuously discharged through a reject outlet 3.

In the vortex cleaner 8 the paper as comminuted into pieces is freed from contaminants such as capsules, screws, small stones, large wire clips etc. which are discharged through an outlet 9. After having been freed from the coarsest contaminants the paper is introduced into the dewaterer which here is shown as a press 15 of the SUDOR type as described in U.S. Pat. No. 3,533,510. The paper suspension fed into the dewatering device at a concentration of about 6 percent is dewatered by a screen 15A in the press to a solids content of about 35 percent. By means of a transport screw the material is conveyed in such a SUDOR press through a screen drum towards a discharge device which is consitituted by a restricted annular outlet closed by biased flaps. The flaps yield to the propelling pressure in so far as the desired degree of dewatering has been obtained. Water from press 15 is returned to the pulper 1 by way of a conduit 38. The returned water along with the water supplied by conduit 4 serves to dilute the paper in pulper 1.

From the dewatering device, the highly concentrated material is introduced by means of a screw conveyor 16 into the working apparatus 17 here shown as a FROTAPULPER as claimed in Swedish published specificaton 314,288. In this apparatus the material is worked for obtaining complete defibration and release of any foreign matter left, such as staples and the like, the treatment being performed in the intermeshing region between two screws. During this treatment, the material is not exposed to any cutting action but will be kneaded in comparatively thick layers in such a way that the treating effect is obtained by mutual friction between portions of the material. From the outlet 18 of the FROTAPULPER the highly concentrated material is introduced into a mixer 20 where dilution of the material to about 1 percent concentration is performed. After prolonged stay of the material in the mixer 20 in accordance with the invention, the suspension is transferred to an overflow box 22 and from there, by means of a pump 23 to a battery 25 of vortex cleaners. From the bottom of the mixer, separated contaminants such as wire clips as well as grit can be removed from the suspension by way of an outlet 21. In the vortex cleaner battery 25, an additional cleaning of the material is performed whereafter the material with the aid of a pump 27 is transferred from a collecting vessel 26 onto a screen 28, the acceptable fraction of which is introduced into a thickener 36 which dewaters the material so that the concentration is increased to about 4 percent. Water from thickener 36 is returned to the mixer 20 by way of conduit 39. The concentrated suspension is introduced into the container 37 for subsequent supply to the paper-making machine. The reject from pressure screen 28 is passed onto a shaker screen 29 for removal, on the one hand, of light weight floating reject or larger coherent pieces of material such as rubber, cork, plastic foil, foamed plastic and wood pieces and, on the other hand, bituminous materials agglomerated in mixer 20. The reject from the cleaner battery 25 is supplied to a vortex cleaner 34 in which residual contaminants of higher specific weight such as staples, wire clips, metal foil, pins, needles, grit as well as heavy plastic matter are removed through an outlet 35. From both the shaker screen 29 and the vortex cleaner 34, an acceptable fraction containing fibrous material is obtained which is re-introduced into the mixer 20.

I claim:

1. In a process for the manufacture of paper pulp from waste paper material, of the type wherein the waste paper material is diluted and comminuted in water in a pulper, precleaned for removal of coarse foreign contaminants, de-watered, kneaded in a kneading apparatus at high concentration, again diluted, after-cleaned for removal of finer or coherent soft foreign contaminants and dewatered to a concentration suitable for introduction into a paper-making machine in that order, characterized in that water respectively used for dilution and obtained during de-watering is circulated in two separate circuits upstream and downstream respectively of the kneading apparatus, that the dwelling time of the waste paper in the pulper is shorter than the time necessary for complete impregnation of the paper with water and just sufficient for obtaining pumpability, that the dewatering before kneading is performd so that the paper is completely impregnated, that the kneading apparatus comprises screw or vane-shaped working means operating in a casing and discharging said material at a final temperature of about 70° to 90°C, and that the concentration of the material discharged from the kneading apparatus is reduced to pumpability in a mixer in which the material is permitted to dwell a time sufficient to cause components of asphalt and bitumen type contained in the waste paper and dispersed in said material to agglomerate to lumps of such a size that they can be screened-off during after-cleaning, and screening off said agglomerated lumps.

2. The process of claim 1 wherein said step of dewatering before kneading comprises further supporting said material with a screen while simultaneously exposing it to a counter-pressure acting against the feed pressure to obtain a determined degree of de-watering.

3. In a process for the manufacture of paper pulp from waste paper material having asphalt or bitumen type components of the type comprising the steps of:

a. comminuting the waste paper in water,
b. pre-cleaning the comminuted material to remove contaminants,
c. de-watering the pre-cleaned material,
d. kneading the de-watered material at high concentration, and heating said dewatered material to a temperature of from 70°C to 90°C wherein said asphalt and bitumen type components become dispersed,
e. diluting the de-watered kneaded material while mixing said kneaded material for a time sufficient to cause said asphalt and bitumen type components dispersed in said kneaded material to agglomerate into lumps,
f. after cleaning said kneaded diluted material by removing finer soft contaminants from said diluted kneaded material and by screening off said agglomerated lumps, and
g. adjusting the concentration of the diluted material to be suitable for use in a paper-making machine, in that order; the improvement wherein said step of comminuting comprises comminuting said waste paper partly with water removed from said pre-cleaned material in said de-watering step for a time less than that required for complete impregnation of the waste paper with water and a time just sufficient that the comminuted waste paper is pumpable, said step of de-watering comprises completely impregnating said pre-cleaned material with water, and said step of adjusting the concentration of said diluted material comprises concentrating the diluted material and further comprising employing water obtained in said step of concentrating in said diluting step.

* * * * *